United States Patent [19]

Davis

[11] 4,227,189

[45] Oct. 7, 1980

[54] ALARM ACTIVATING DEVICE

[76] Inventor: Albert F. Davis, 2148 W. Washburn, Chicago, Ill. 60608

[21] Appl. No.: 17,389

[22] Filed: Mar. 5, 1979

[51] Int. Cl.³ .......................... G08B 13/10; G08B 1/08; H04Q 7/00

[52] U.S. Cl. ...................................... 340/573; 340/539; 340/574; 340/665; 340/668; 200/85 R; 200/67 B; 200/61.76; 455/100

[58] Field of Search ............... 340/573, 548, 568, 574, 340/575, 665, 666, 667, 668, 539; 200/61.74, 61.76, 67 A, 67 B, 85 R, 85 A; 325/111, 118; 455/100

[56] References Cited

U.S. PATENT DOCUMENTS

| | | | |
|---|---|---|---|
| 1,758,546 | 5/1930 | Wartmann | 340/573 |
| 2,135,476 | 11/1938 | Rush | 340/574 |
| 2,249,645 | 7/1941 | Applegarth | 200/85 R |
| 2,381,547 | 8/1945 | Leininger | 42/1 K |
| 2,996,587 | 8/1961 | McCarthy | 340/687 |
| 3,440,635 | 4/1969 | Hull | 325/111 |
| 3,911,394 | 10/1975 | Shames | 340/573 |

*Primary Examiner*—John W. Caldwell, Sr.
*Assistant Examiner*—Donnie L. Crosland
*Attorney, Agent, or Firm*—Joan I. Norek

[57] ABSTRACT

An alarm activating device is provided for closing a normally open circuit upon release of body pressure upon the rearward wall of the device, comprising a first, second, and third plate supported respectively in substantially parallel alignment behind a mounting plate, which mounting plate is adapted to be secured behind a belt in close proximity to a body, the first and third plates being spaced-apart and movable together from a position wherein one contacts the second plate, to a position where the other contacts the second plate, including means for applying constant positive pressure to the first plate opposite the second plate, and further including a first and a second contact in series circuit relationship, supported adjacent one another in alignment on the first and second plates.

8 Claims, 5 Drawing Figures

FIG. 1
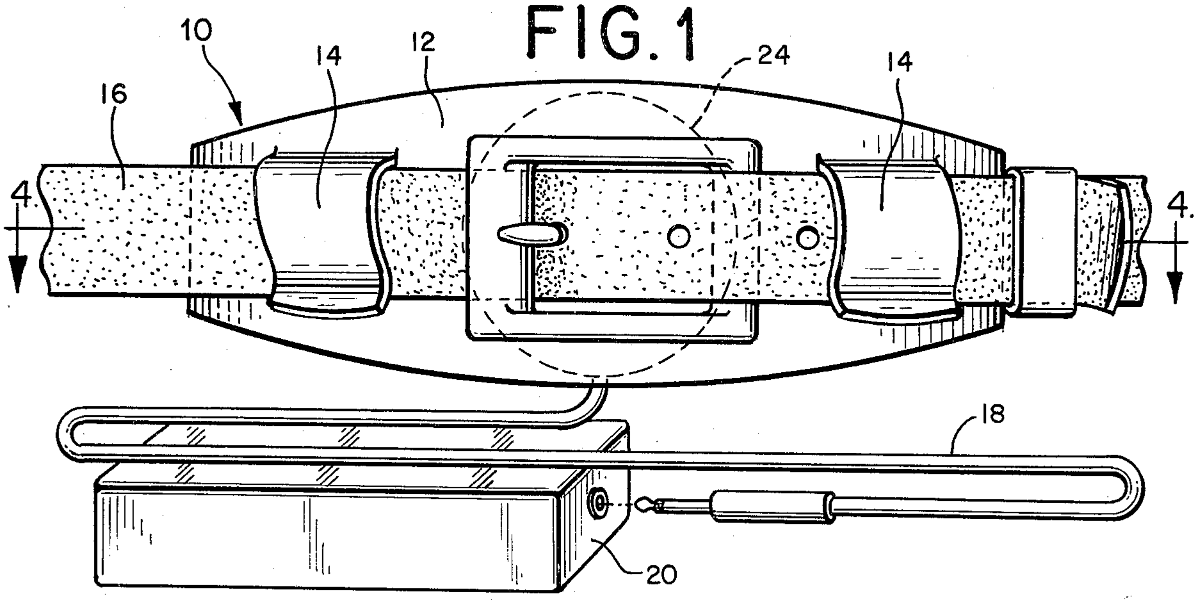
FIG. 2
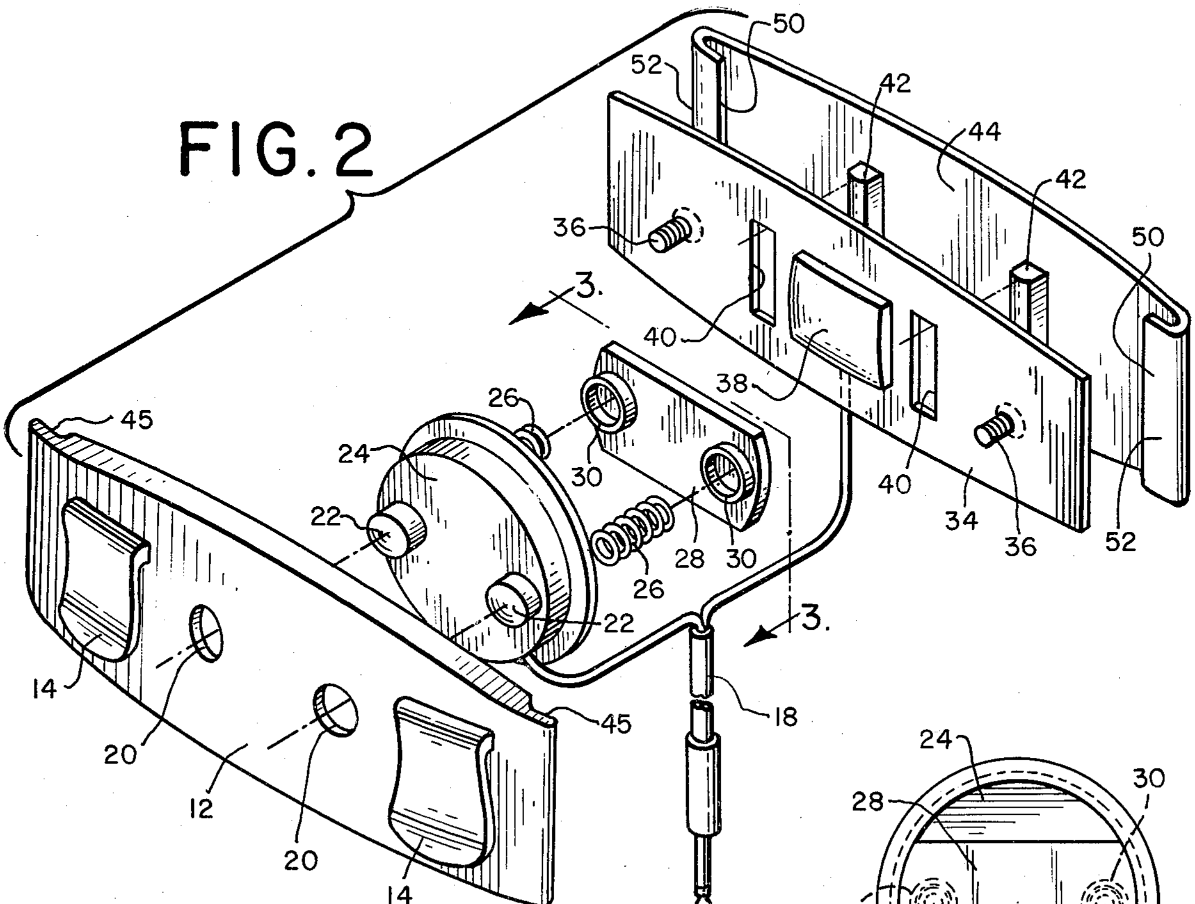
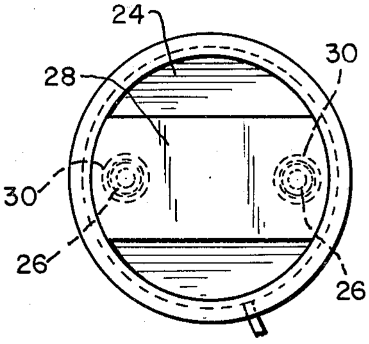
FIG. 3

ALARM ACTIVATING DEVICE

TECHNICAL FIELD

This invention relates to the technical field of alarm activating devices, particularly alarm activating devices worn close to a person's body and turned on by body movement. This invention particularly relates to a device for activating an alarm or signal for emergency purposes, and particularly for activiating such an alarm in a manner that cannot normally be detected by a viewer.

BACKGROUND OF THE INVENTION

Emergency alarms are well known for summoning the help of the police, or the like, and are often used in banks and other establishments. Such devices normally are stationary installations that require manual operation of a switch or the like. Although the manual controls of such switches are generally placed in convenient reach of an employee, the same cannot be operated if the employee is prevented from touching anything in the vicinity. Moreover, since such devices are generally stationary, the ability of an employee to activate them when not in the immediate vicinity is severely restricted.

Portable alarm activating devices that are worn on the body and activated by body movement are known in the art, such as those disclosed in U.S. Pat. Nos. 2,135,476 and 3,440,635. These devices are fastened to the body, beneath outer clothing for concealment, and are activated by body movement, such as an expansion of the chest cavity of the body by a large intake of air, or by movement of a limb of the body, such as the arm. The disadvantages of such devices are that movement of a person's limb in the manner desired may be prevented in a given situation, air intake movement and limb movement may be detected by a viewer, and such movement can easily be done unintentionally, setting off the alarm unnecessarily.

It is an object of the present invention to provide a device for activating any alarm that can be set off by the closing of an electrical circuit. It is another object of the invention to provide an alarm activating device that is worn on the body and is turned on by a body movement that is normally undetectable to a viewer. It is an object to provide an alarm activating device that is controlled by a body's voluntary muscle movement that is seldom, if ever, performed unintentionally. It is an object to provide such a device that is worn close to the body, generally concealed by outer clothing.

DISCLOSURE OF THE INVENTION

These and other objects are realized in accordance with the invention by an alarm activating device that is mounted to and worn behind a belt or the like, and in which an electrical circuit is closed by a contraction of the body's stomach muscles. The alarm activating device includes a normally off switch, held in the off position by outward pressure from the body. The contraction of the stomach muscles removes outward pressure of the body on the device, allowing pressure means, such as springs or the like, to move one electric contact towards the body and to a second contact, closing an electrical circuit. Such circuit is connected with an alarm transmitter or the like, which transmitter can also be easily worn or carried on the body.

BRIEF DESCRIPTION OF THE DRAWINGS

FIG. 1 is an elevated front view of the alarm activating device embodying features of the present invention, shown secured to a belt and interconnected with a transmitter;

FIG. 2 is an exploded perspective view of the alarm activating device of FIG. 1;

FIG. 3 is a cross-sectional view of the alarm activating device of FIG. 1, taken along line 3 of FIG. 2;

PREFERRED EMBODIMENT OF THE INVENTION

Figure 4:
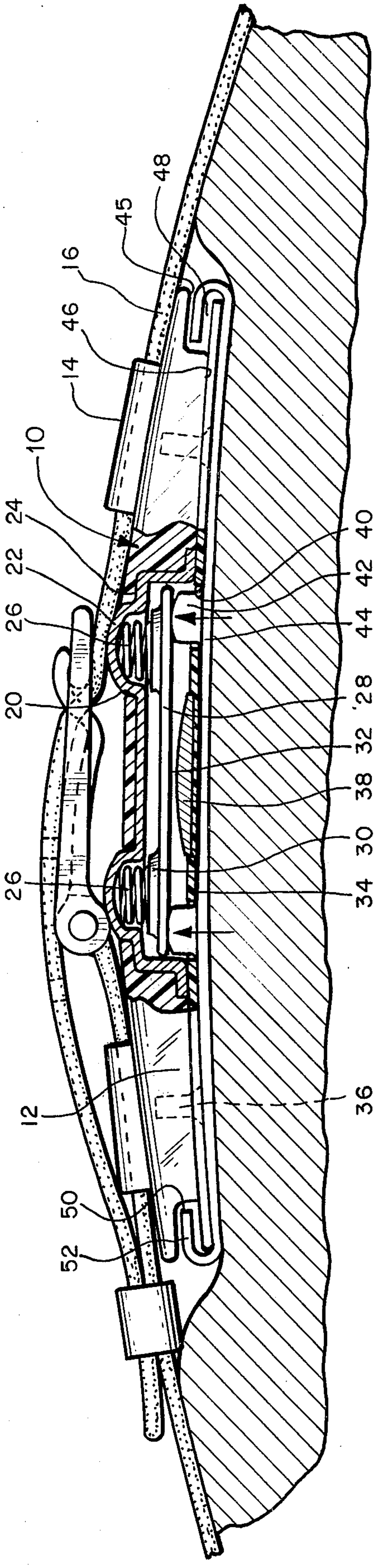
FIG. 4 is a partially cut-away side view of the alarm activating device of FIG. 1, shown together with a belt as in FIG. 1 and shown in the normally off switch position.

Referring now to the drawings, particularly to FIG. 1, there is shown an alarm activating device, designated generally by the reference numeral 10. A mounting plate 12 forms the forward wall of the device and includes a pair of belt hooks 14 that secure the device 10 to, and behind, any typical belt 16. A double-wire switching cord 18 runs from the alarm activating device 10 to a transmitter 20, or the like, which in turn is activated by the closing of a circuit within the alarm activating device 10. The alarm activating device 10, mounted on any suitable belt, can easily be concealed by a person's outer clothing.

Referring now to FIGS. 2 and 3 also, there is shown in exploded and cross-sectional form the alarm activating device 10. The mounting plate 12 includes a pair of apertures 20 that receive the protuberances 22 on a switch housing 24. The proturberances 22 receive a pair of springs 26. The protuberances 22 hold these springs 26 in alignment. Providing the apertures 20 in the mounting plate 12 to receive the protuberances 22 compacts the device 10 to minimize bulk.

Rearward of the springs 26 is a first plate 28 that is movable with respect to the mounting plate 12. The first plate 28 includes two substantially circular shoulders 30 adjacent the springs 26, which shoulders 30 also facilitate maintaining the springs 26 in proper alignment, perpendicular to the first plate 28. Pressure exerted by these springs 26 upon the first plate 28 is rearward of the mounting plate 12. The first plate 28 itself is a first contact 32.

Rearward of the first plate is a second plate 34, stationarily mounted to the mounting plate 12 by means of screws 36, as shown, or any other convenient means. The second plate 34 supports a second contact 38 adjacent, and in alignment with, the first contact 32.

The second plate 34 further includes a pair of apertures 40 flanking the second contact 38 through which actuator blocks 42, which are disposed rearwardly of the second plate 34 and are supported by a pressure plate 44, can pass. These apertures or slots 40 are aligned so that the actuator blocks 42 can pass through and are also in slight offset alignment with the springs 26 on the opposite side of the first plate 28.

The mounting plate 12 includes opposed internal shoulders 45 flanking the rearward or inner face 46 of the mounting plate 12. The stationary or fixed second plate 34 extends beyond the rearward face 46 of the mounting plate 12 at the sides, forming a channel 48 at each side, which can best be seen in FIGS. 4 and 5.

The third or pressure plate 44 forms the rearward wall of the alarm activating device 10. This third plate 44 supports the inwardly extending actuator blocks 42. This pressure plate 44 is formed with its opposed side free ends 50 turned back so as to extend towards each other, forming end flanges 52. These end flanges 52 are held within the channels 48 between the fixed second plate 34 and the mounting plate 12.

Figure 5:
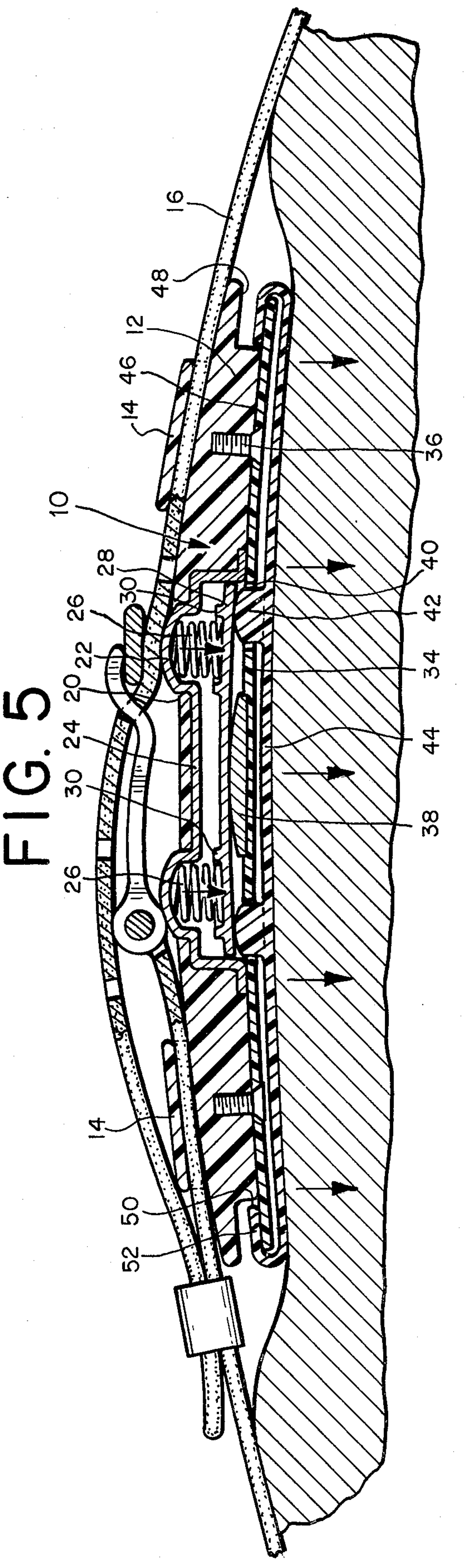
FIG. 5 is a partially cut-away side view of the alarm activating device of FIG. 1, as shown in FIG. 1 together with a belt and shown in the on switch position.

Referring now to FIGS. 4 and 5 also, the channels 48 are of sufficient width to allow movement of the pressure plate 44 forward and rearward with respect to the mounting plate 12. The mounting plate 12, the first movable contact plate 28, the second stationary or fixed plate 34, and the third or pressure plate 44, are all disposed in substantially parallel alignment from front to rear respectively of the device 10.

The actuator blocks 42 extend toward the movable first contact plate 28, maintaining the movable first plate 28 and the movable pressure plate 44 spaced-apart a minimum distance. The pressure plate 44 is movable by virtue of the possible movement of its flanges 52 forward or rearward in the channels 48. At the same time, the flanges 52 are formed so as to be positioned in close proximity to the side ends of the fixed second plate 34, whereby sideways movement of the pressure plate 44 is restricted. The alarm activating device 10 is normally mounted on the belt 16 and secured thereby firmly to a body so that the pressure plate 44 is normally in a forward position as shown in FIG. 4.

When the pressure plate is in the normal forward position as shown in FIG. 4, the pressure plate 44 is positioned adjacent to and substantially abutting the stationary second plate 34. The actuator blocks 42 on the pressure plate 44 hold the movable contact plate 28 spaced-apart from the stationary second plate 34, preventing the touching of the plate 28 and the second contact 38 on the second plate 34.

Contraction of the wearer's stomach muscles releases the forward pressure on the pressure plate 44, allowing it to move away from the fixed second plate 34. The release of forward pressure on the pressure plate 44 also allows the movable first plate 28 to move toward the fixed second plate 34 under the action the springs 26. The springs 26 not only push the first plate 28 up to the second plate 34 (while moving the pressure plate 44 away from the second plate 34), they thereby move the first contact 32 into a closed position, touching the second contact 38, and thereby closing the electric circuit.

The electric circuit, normally held open by the alarm activating device, may form a part of the circuitry of a transmitter or any other device capable of setting off an alarm by virtue of the closing of an electrical circuit. Such transmitters as such form no part of the invention, which invention is embodied in the alarm activating device 10, and which is essentially a switch to hold open and to close the first and second contacts 32, 38. Again, the circuit is closed, i.e., the switch is turned on, by contraction of the wearer's stomach muscles, which releases the forward pressure on the pressure plate 44, allowing the alarm activating device 10 to be controlled by the action of the springs 26 which exert a positive pressure upon the movable first plate 28, bringing it into contact with the fixed or stationary second plate 34. A circuit is thereby closed between the first and second contacts 32, 38 of the first and second plates 28, 34 respectively.

The several plates of the alarm activating device 10 can conveniently be made of plastic so as to be light in weight. Forming the switch means of the alarm activating device is a series of substantially parallel plates resulting in an elongated device with minimum of depth so as to be worn comfortably and in close contact with the body. The alarm activating device 10, particularly with respect to the mounting plate 12 and the pressure plate 44, can be formed with a slight bow outwardly.

The definite contraction of stomach muscles necessary to release the pressure upon the pressure plate 44, allowing it to move relative to the fixed second plates 34, is a body movement that cannot be duplicated by other body functions, such as taking a deep breath or the like. Now as such, the alarm activating device 10 will not be unintentionally set off. Preferably, the switching cord 18 can easily be disengaged from and engaged to a transmitter or the like so that the alarm activating 10 can be rendered non-functional when a person is putting it on or taking it off.

While several embodiments described herein are at present considered to be preferred, it is understood that various modifications and improvements may be made therein, and it is intended to cover in the appended claims all such modification and improvements as fall within the true spirit and scope of the invention.

What is desired to be claimed and secured by Letters Patent of the United States is:

1. An alarm activating device comprising:

a movable contact plate comprising a first contact and disposed in substantially parallel alignment with a fixed contact plate, which fixed contact plate supports a second contact, said fixed contact plate being stationarily secured to a mounting plate opposite said movable contact plate, and said first and said second contacts being disposed adjacent one another;

means for applying positive pressure to said movable contact plate about its face opposite said fixed contact plate;

a movable pressure plate disposed in substantially parallel alignment to said fixed contact plate opposite said movable contact plate;

means maintaining a minimum spaced-apart position of said movable pressure plate and said movable contact plate;

means allowing free movement of said movable pressure plate from a position abutting said fixed contact plate to a position spaced-apart a distance from said fixed contact plate at least equal to said minimum spaced-apart disposition of said movable pressure plate and said movable contact plate; and an electric circuit that is closed upon contact of said first and second contacts.

2. The alarm activating device of claim 1 wherein said mounting plate includes at least one hook for securement to a belt opposite said fixed contact plate.

3. The alarm activating device of claim 2 wherein said means for applying positive pressure to said movable contact plate is at least one spring that is housed between said mounting plate and said movable contact plate and is under load when said movable contact plate is spaced-apart from said fixed contact plate.

4. The alarm activating device of claim 3 wherein said means for maintaining a minimum spaced-apart disposition of said movable contact plate and said movable pressure plate is at least one actuating block extending between said movable plates.

5. The alarm activating device of claim 4 wherein said activating block is supported on said movable pressure plate.

6. The alarm actuating device of claim 5 wherein said fixed contact plate includes at least one slot through which said actuating block passes.

7. The alarm actuating device of claim 6 wherein said movable pressure plate is formed with its free side ends turned inward forming flanges, said mounting plate is formed with opposite internal shoulders form a side notch with the side ends of said fixed contact plate, and said pressure plate flanges are secured within said notches, whereby limited movement of said movable pressure plate, from said position abutting said fixed contact plate to a position spaced-apart a distance from said fixed contact plate at least equal to said minimum spaced-apart disposition of said movable pressure plate and said movable contact plate, is allowed.

8. An alarm activating device for closing a normally open circuit upon release of body pressure upon the rearward wall of said device, comprising:

a first, second, and third plate supported respectively in substantially parallel alignment behind a mounting plate which mounting plate is adapted to be secured behind a belt in close proximity to a body, said first and third plates being spaced-apart and movable together from a position wherein said first plate contacts said second plate to a position wherein said third plate contacts said second plate;

means for applying constant positive pressure to said third plate opposite said second plate; and a first and a second contact in series circuit relationship supported adjacent one another in alignment on said first and second plates.

* * * * *